(12) United States Patent
Jeunesse et al.

(10) Patent No.: US 11,001,017 B2
(45) Date of Patent: May 11, 2021

(54) MANUFACTURING METHOD OF A COMPONENT OF AUTOMOTIVE VEHICLE EQUIPMENT AND ASSOCIATED COMPONENT OF EQUIPMENT

(71) Applicant: FAURECIA AUTOMOTIVE INDUSTRIE, Nanterre (FR)

(72) Inventors: Steve Jeunesse, Mouzon (FR); Xavier Bathelier, Saint Pierremont (FR)

(73) Assignee: FAURECIA AUTOMOTIVE INDUSTRIE, Nanterre (FR)

( * ) Notice: Subject to any disclaimer, the term of this patent is extended or adjusted under 35 U.S.C. 154(b) by 306 days.

(21) Appl. No.: 16/032,863

(22) Filed: Jul. 11, 2018

(65) Prior Publication Data
US 2019/0016070 A1 Jan. 17, 2019

(30) Foreign Application Priority Data

Jul. 11, 2017 (FR) ...................................... 17 56570

(51) Int. Cl.
*B29C 70/54* (2006.01)
*B29C 70/46* (2006.01)
*B29L 31/30* (2006.01)

(52) U.S. Cl.
CPC ............ *B29C 70/545* (2013.01); *B29C 70/46* (2013.01); *B29C 2793/0045* (2013.01); *B29L 2031/30* (2013.01); *B29L 2031/3017* (2013.01)

(58) Field of Classification Search
CPC ...................... B29C 70/545; B29C 2793/0045
See application file for complete search history.

(56) References Cited

U.S. PATENT DOCUMENTS

| | | | |
|---|---|---|---|
| 5,126,091 A * | 6/1992 | Melton | B29C 33/0033 264/156 |
| 5,141,690 A * | 8/1992 | Marshall | B29C 33/0033 264/154 |
| 5,246,520 A * | 9/1993 | Scanlon | B29C 70/504 156/245 |
| 8,951,455 B2 * | 2/2015 | Kampke | B29C 70/46 264/155 |

(Continued)

FOREIGN PATENT DOCUMENTS

| | | | | |
|---|---|---|---|---|
| DE | 2944371 A1 * | 5/1981 | ........... | B29C 70/545 |
| DE | 3715409 A1 * | 12/1987 | ................ | B26F 1/02 |

(Continued)

OTHER PUBLICATIONS

International Search Report for French application No. FR 17 56570, dated Mar. 13, 2018, 2 pages.

*Primary Examiner* — Atul P. Khare
(74) *Attorney, Agent, or Firm* — Reising Ethington P.C.

(57) ABSTRACT

A manufacturing method for an automotive vehicle component that includes the steps of: arranging at least a first skin capable of solidifying on a first half-mold of a mold; closing a second half-mold of the mold to form the first skin; then solidifying the first skin in the molding cavity defined between the first half-mold and the second half-mold. The second half-mold has a piercing element with at least one point-shaped end, and the method includes piercing by the piercing element of at least one through-hole in the first skin before solidification of the first skin.

12 Claims, 4 Drawing Sheets

(56) References Cited

U.S. PATENT DOCUMENTS

| | | | |
|---|---|---|---|
| 2005/0183813 A1* | 8/2005 | Gonsalves | B29C 70/088 |
| | | | 156/245 |
| 2011/0031643 A1* | 2/2011 | Hache | B26D 7/10 |
| | | | 264/154 |
| 2015/0054207 A1 | 2/2015 | Stepanski | |

FOREIGN PATENT DOCUMENTS

| | | | | |
|---|---|---|---|---|
| DE | 102010053960 A1 | | 6/2012 | |
| DE | 102011056981 A1 | * | 6/2013 | B29C 70/545 |
| FR | 2763881 A1 | | 12/1998 | |
| FR | 3033521 A1 | | 9/2016 | |
| GB | 2256611 A | * | 12/1992 | B29C 70/44 |
| WO | WO-9322128 A1 | * | 11/1993 | B29C 70/46 |
| WO | WO-9731772 A1 | * | 9/1997 | B29C 65/74 |
| WO | WO-2017168104 A1 | * | 10/2017 | B29C 66/7392 |

\* cited by examiner

MANUFACTURING METHOD OF A COMPONENT OF AUTOMOTIVE VEHICLE EQUIPMENT AND ASSOCIATED COMPONENT OF EQUIPMENT

TECHNICAL FIELD

The present invention relates to a method for manufacturing a component of automotive vehicle equipment, of the type comprising the following steps:
providing at least one first skin capable of solidifying on a first half-mold of a mold;
closing a second half mold of the mold to complete the first skin; then
solidification of the first skin in the molding cavity defined by the first half-mold and the second half-mold.

The invention also relates to a component of automotive vehicle equipment that may be produced by such a manufacturing method.

BACKGROUND

Such a method is used, in particular, to manufacture composite panels for the production of loading floors of a motor vehicle. These panels consist, for example, of two skins based on long flax fibers bonded by a thermosetting resin. The skins are arranged on both sides of a cardboard spacer with a honeycomb structure.

These panels are usually functionalized. In particular, they must allow the attachment of handles, luggage retaining rings or other elements applied to the panel.

Generally, this attachment is obtained by perforating the panel after manufacture to make a through hole. An attachment element, such as a pin, or a screw-nut system is introduced into the through hole.

Such a method is not entirely satisfactory. The edge of the hole made in the component is often weakened by the piercing because the fibers are cut locally. This decreases the mechanical strength of the assembly over time.

In addition, the method requires strengthening of the hole after piercing. This may require significant operator time and high piercing accuracy.

SUMMARY

An object of the invention is to produce a component of automotive vehicle equipment having at least one through hole, which is mechanically resistant, while being inexpensive.

To this end, the object may be achieved using a method of the aforementioned type, characterized in that the second half-mold comprises a piercing element having at least one end in the form of a point, wherein the method comprises piercing by the piercing element of a through hole at least in the first skin before the solidification of the first skin.

According to other advantageous aspects of the invention, the method comprises one or more of the following characteristics, taken separately or in any technically feasible combination:
the first skin comprises a polymer matrix with fibers embedded in the matrix, wherein the matrix is fluid during the piercing, and wherein the matrix solidifies around the piercing element after the piercing.
the piercing element displaces the fibers contained in the matrix to the periphery of the piercing element.
the first skin is arranged on a first face of a spacer, in particular a honeycomb spacer; when the first skin is arranged in the first half-mold, the piercing element passes through the spacer during the piercing step.
a second skin is placed on a second face of the spacer, the piercing element pierces the second skin during the piercing step, then the second half-mold is applied.
a method as defined above comprises, after the step of piercing the first skin, the following steps:
introducing a spacer and a second skin between a first half-mold and an additional second half-mold of an additional mold, wherein the second additional half-mold is provided with an additional piercing element in the form of a point,
piercing an additional hole through the second skin and the spacer by the additional piercing element;
assembling the first skin on a first face of the spacer located opposite a second face on which is fixed the first skin, wherein the additional hole extends opposite the through hole.
a method as defined above comprising the introduction of an insert in the through hole.
the insert is passed into the through hole by the piercing element by being arranged around the piercing element during the piercing step, and the insert remains in the through hole after removal of the piercing element;
the first skin is arranged on a first face of a spacer, in particular a honeycomb spacer; when the first skin is placed in the first half-mold, the piercing element passes through the spacer during the piercing step, the insert is introduced into the spacer during the piercing step.
the insert comprises at least one outer protrusion retaining the insert inserted into the spacer and/or into the skin during the implementation step.

The invention further relates to a component of automotive vehicle equipment, capable of being produced by a manufacturing method as described above.

BRIEF DESCRIPTION OF THE DRAWINGS

The invention will be better understood upon reading the description which follows, given solely by way of nonlimiting example and with reference to the appended drawings, in which.

DETAILED DESCRIPTION OF THE ILLUSTRATED EMBODIMENTS

Figure 1:
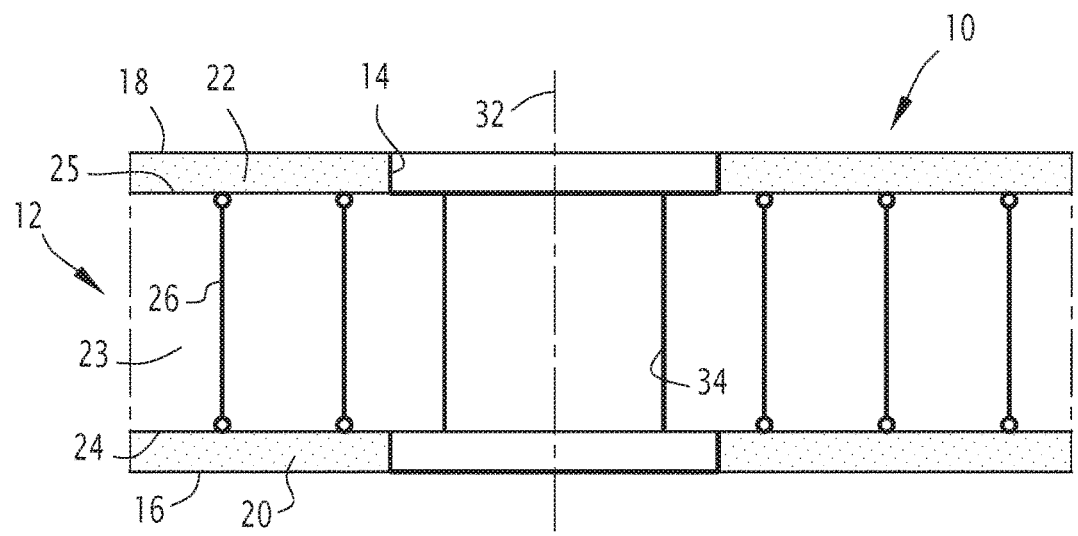
FIG. 1 shows a partial sectional view of a component produced by a manufacturing method according to the invention.

FIG. 1 shows, partially and in section, a component of automotive vehicle equipment 10 obtained by a first method according to an embodiment of the invention. The component 10 is a structural part, such as a trunk lid rear shelf, a passenger compartment or trunk false floor, or an under-engine protection.

The component of automotive vehicle equipment 10 comprises a composite panel 12, and a fixing element 14 that is mounted in the composite panel 12.

The composite panel 12 has a "sandwich" type structure, comprising a first face 16 and an opposite second face 18.

More specifically, the composite panel 12 comprises a first skin 20 and a second skin 22, respectively defining the first face 16 and the second face 18 of the composite panel 12. The composite panel 12 further comprises a spacer 23 interposed between the two skins 20, 22.

More particularly, the first skin 20 is fixed on a first face 24 of the spacer 23, and the second skin 22 is fixed on a second face 25 opposite the first face 24 of the spacer 23.

The spacer 23 is preferably based on a cellular or honeycomb structure. Thus, the spacer 23 has a plurality of walls 26 that are substantially perpendicular to the faces 16, 18 of the panel 12. The walls 26 define central spaces with a closed contour forming the honeycomb. The honeycomb defines, for example, polygonal meshes, in particular hexagonal meshes.

The spacer 23 is advantageously made of a light material, such as paper or cardboard. The density of the spacer 23 is preferably less than 1500 g/m$^2$ and is substantially between 200 g/m$^2$ and 1200 g/m$^2$.

Each skin 20, 22 has a greater density, and preferably a lower thickness, with respect to the density and the thickness of the spacer 23.

Each skin 20, 22 comprises reinforcing fibers 28 bonded to one another by a polymer matrix 30. The reinforcing fibers 28 are, for example, chosen from carbon fibers, ceramic fibers such as glass fibers, or even cellulosic fibers of natural origin such as flax fiber, hemp, kenaf or jute.

According to a first embodiment, the polymer matrix 30 is a thermosetting matrix, notably comprising one or more unsaturated polyesters.

According to a second embodiment, the polymer matrix 30 is a thermoplastic matrix, comprising, in particular, one or more materials chosen from polyamides (PA), polyethylenes (PE), polypropylenes (PP) and polyesters such as poly(ethylene terephthalate) (PET).

In the embodiment of FIG. 1, the first skin 20 and the second skin 22 are substantially identical. According to one variant, the first skin 20 and the second skin 22 are different, comprising, in particular, reinforcing fibers 28 and/or a different polymer matrix 30.

The fixing element 14 is arranged along an axis 32 through the first skin 20, the spacer 23 and the second skin 22. In the component of automotive vehicle equipment 10 visible in FIG. 1, the axis 32 is perpendicular to the first face 16 and the second face 18 of the panel 12.

The fixing element 14 is inserted into a through hole 34 formed through the first skin 20, the spacer 23 and the second skin 22.

In this example, the fixing element 14 is a socket that is advantageously threaded and designed to receive an insert on the composite panel 12.

Figure 2:
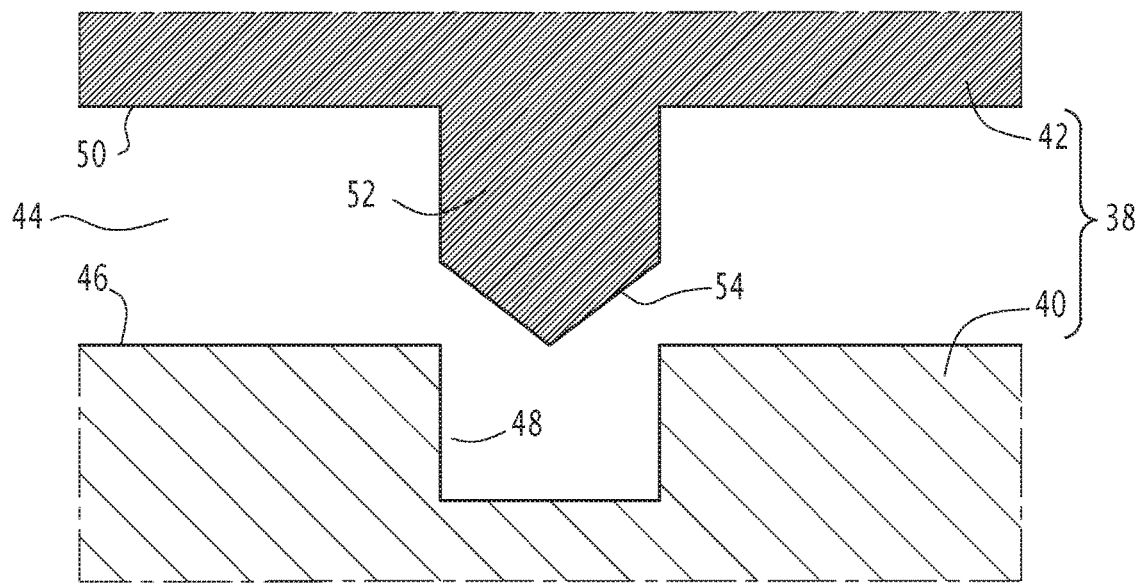
FIG. 2 shows a partial sectional view of a mold for the manufacture of the component.

FIG. 2 represents an example of a mold 38 suitable for manufacturing the component 10. The mold 38 comprises a first half-mold 40 and a second half-mold 42. The first half-mold 40 and the second half-mold 42 delimit a cavity 44 between them.

The first half-mold 40 and the second half-mold 42 are movable relative to each other between an open position for assembling/disassembling the two half-molds and a closed molding position.

The first half-mold 40 has a first molding face 46. It defines an orifice 48 which opens into the first face 46.

The second half mold 42 has a second molding face 50 opposite the first face 46. It comprises a piercing element 52 fixed on the second face 50 facing the orifice 48. The piercing element 52 protrudes from the second face 50.

The piercing element 52 is designed to be received in the orifice 48 in the closed molding position.

In this position, the piercing element 52 is able to pierce at least the first skin 20. Advantageously, the piercing element 52 is able to pierce the first skin 20, the spacer 23, and the second skin 22.

The piercing element 52 has, for example, the form of a point at its free end 54.

The piercing element 52 here has a body of circular shape. In a variant, the body of the piercing element 52 has a slot shape, to provide a quarter-turn type fixing.

Figure 3:
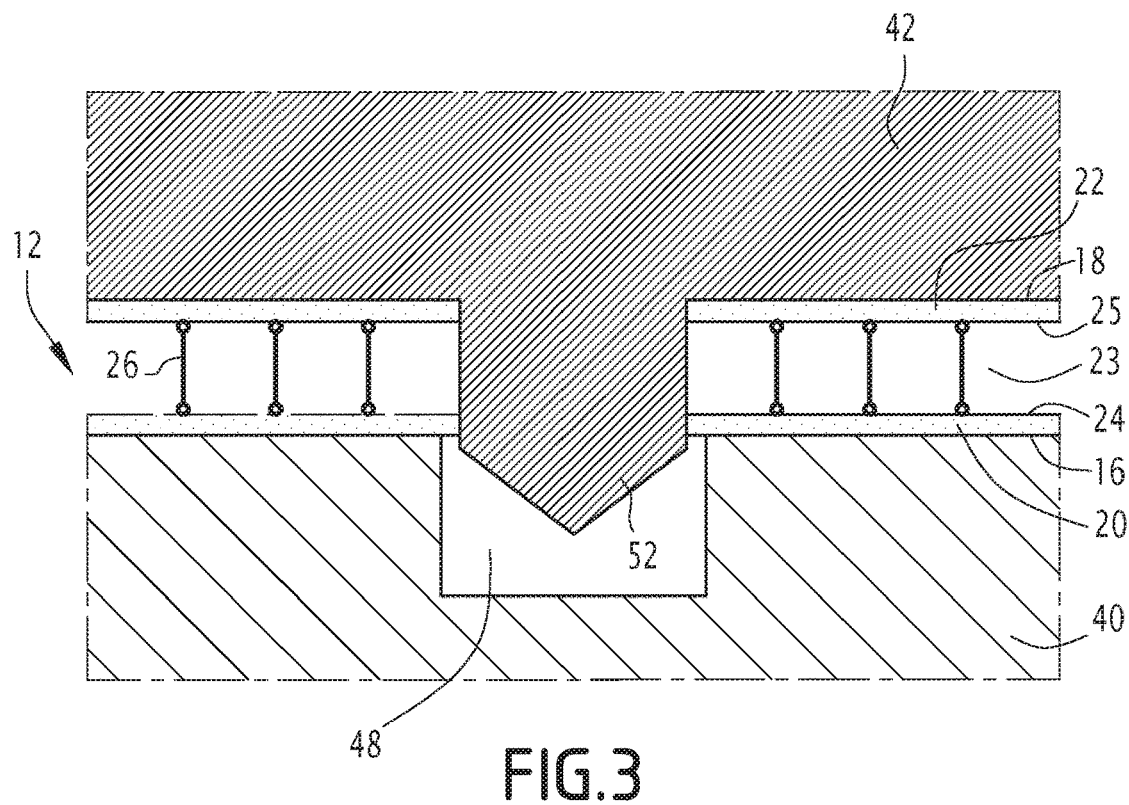
FIG. 3 shows a view similar to FIG. 2 with the component in the mold during manufacture.

FIG. 3 shows the component 10 in the mold 38 during manufacture. The component 10 is in the molding cavity 44. The first skin 20 is in direct contact with the first face 46 of the first half-mold 40, while the second skin 22 is in direct contact with the second face 50 of the second half mold 42.

The piercing member 52 has pierced the first skin 20, the second skin 22, and the spacer 23. At least a portion of the piercing member 52 enters the orifice 48.

The manufacturing process of a component 10 will now be described according to a first embodiment which concerns thermoplastic matrices.

First, a mold 38 as described above is provided and is placed in the open position.

Figure 4:
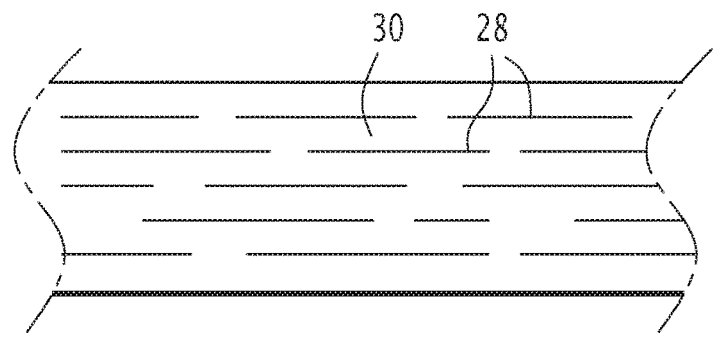
FIG. 4 shows a view from above of the skin during manufacture, before the insertion of a piercing element, wherein the skin matrix is in the fluid state.

The first skin 20 is heated in a heating station to bring the matrix 30 into a fluid state, as shown in FIG. 4.

Then, the first skin 20 is deposited on the first face 46 of the first half-mold 40.

Then, the spacer 23 is placed on the first skin 20, while the first face 24 of the spacer 23 is placed in contact with the first skin 20.

The second skin 22 is heated in the heating station to bring the matrix 30 into the fluid state. The second skin 22 is then disposed on the second face 25 of the spacer 23.

In a variant, the two skins 20, 22 and the spacer 23 previously superimposed are assembled and then placed between two heating plates in order to simultaneously heat the two skins 20, 22 and thus cause the fusion of the reinforcing fibers 28.

Then, the mold 38 is moved to its closed position. The height of the cavity 44 of the mold 38 between the first half-mold 40 and the second half-mold 42 decreases, wherein the first half-mold 40 and the second half-mold 42 come closer to each other.

The piercing element 52 comes into contact with the second skin 22 and pierces the second skin 22 as it moves with the second half-mold 42.

As the closure of the mold 38 continues, the piercing element 52 completely pierces the second skin 22. As a result, a through hole 34 is formed in the second skin 22.

The piercing element 52 then pierces the spacer 23 and then the first skin 20.

Figure 5:
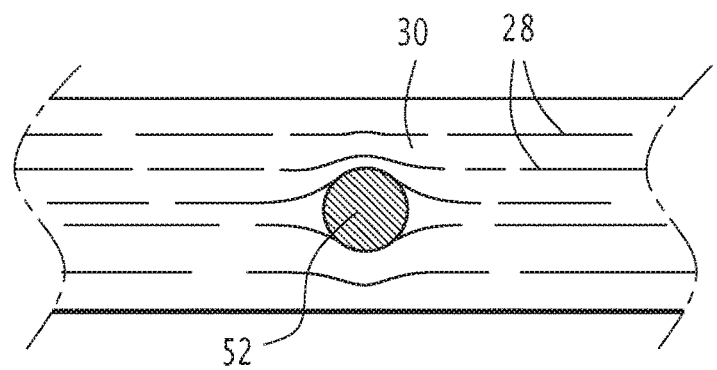
FIG. 5 shows a view similar to FIG. 4, wherein the piercing element is inserted into the skin and the fibers of the skin have been displaced by the piercing element.

The matrix 30 of the first skin 20 has a fluid state during piercing. As shown in FIG. 5, during the piercing of the first skin 20, the piercing member 52 moves the fibers 28 in the first skin 20 to the periphery of the piercing member 52.

This avoids embrittlement of the periphery of the hole during its piercing which would be caused by cutting the reinforcing fibers contained in the matrix.

When the mold reaches its closed position, the through hole 34 extends over the entire height of the composite panel 12 and opens through the first face 14 and the second face 25.

The piercing element 52 thus pierces the entire composite panel 12.

In this position, the piercing element 52 enters the orifice 48 of the first half-mold 40. The second half-mold 42 is in direct contact with the second skin 22.

Then, the first skin 20 and the second skin 22 cool in the mold 38. The matrix 30 of each skin 20, 22 solidifies during cooling, and the fibers 28 contained in the matrix 30 are frozen in position in the solidified matrix 30.

After solidification of the first skin 20 and the second skin 22, the mold returns to its open position. The piercing member 52 is withdrawn from the through hole 34, and the panel 12 with the through hole 34 is then removed from the mold 38.

After opening of the mold 38, a retaining insert 56 is mounted in the hole 34 pierced by the piercing element 52. The retaining insert 56 is, for example, a socket.

Figure 6:
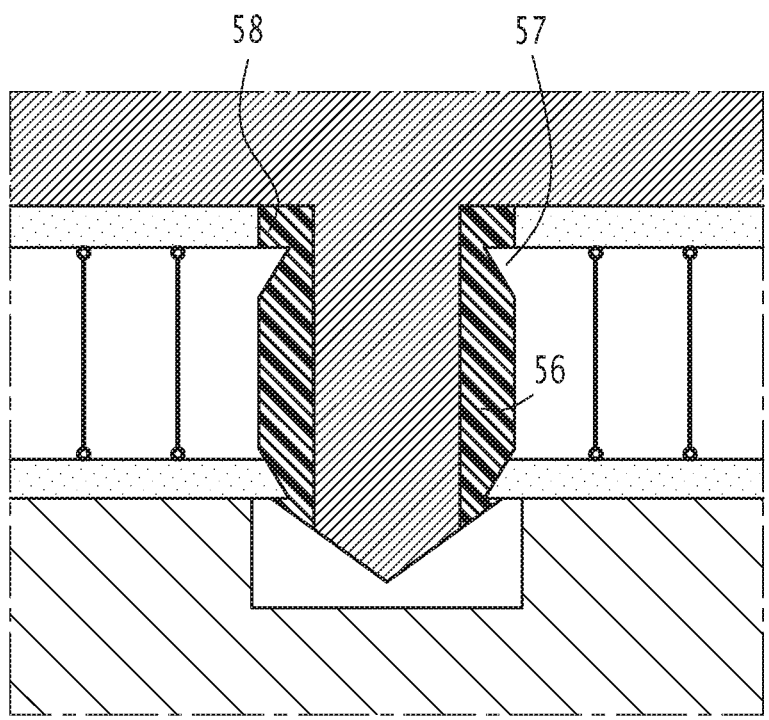
FIG. 6 shows a view similar to FIG. 3 according to a variant of the manufacturing method.

FIG. 6 shows an alternative embodiment of the retaining insert 56. In this variant, the retaining insert 56 is attached to the composite panel 12 simultaneously with the piercing.

The retaining insert 56 is hollow, and engages around the piercing element 52 before piercing. Internally, it has a shape that is complementary to the shape of the piercing element 52.

The retaining insert 56 advantageously has an outer surface defining notches 57 to lock in translation along the axis 32 in the through hole 34. For example, between the notches 57, the insert 56 comprises at least one external retaining protuberance 58 of the retaining insert 56 inserting into the spacer 23 and/or the first skin 20 and/or the second skin 22 during piercing.

The retaining insert 56 is advantageously internally threaded in order to allow direct screwing of the screws in the through hole 34. As a variant, it has a device for snap-fitting.

The retaining insert 56 is, for example, made by the injection of a plastic material, for example polypropylene (PP) or polyamide (PA) that is rigid enough to allow efficient screwing.

Once the skins have solidified, the solidified skins 20, 22 keep the retaining insert 56 locked in position. The retaining insert 56 remains in the through hole 34 after removal of the piercing element 52.

Figure 7:
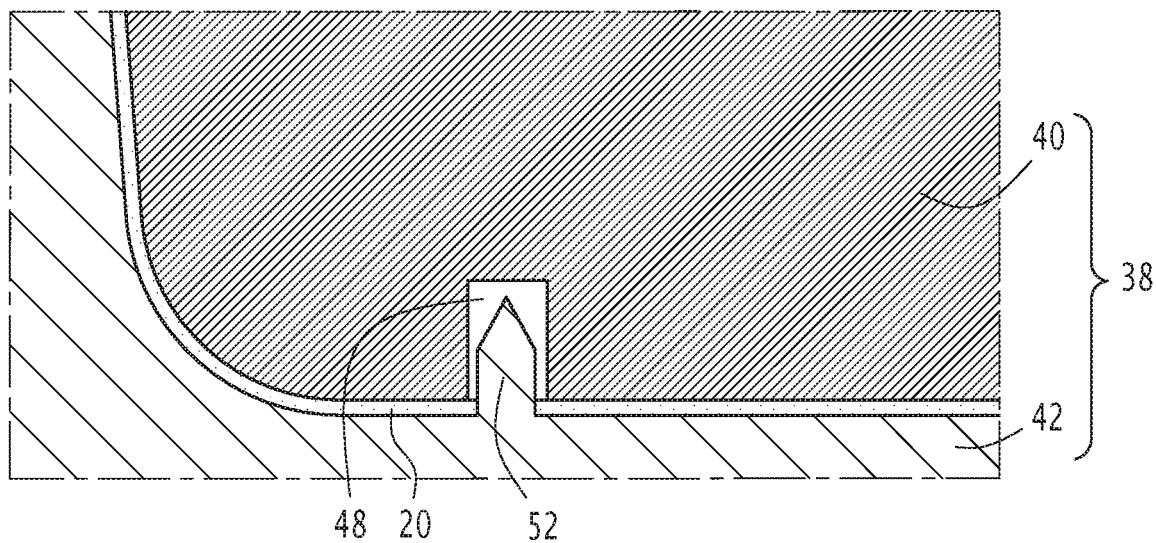
FIG. 7 shows a view of another manufacturing method according to the invention, wherein the piercing element has pierced a first skin in a mold.
Figure 8:
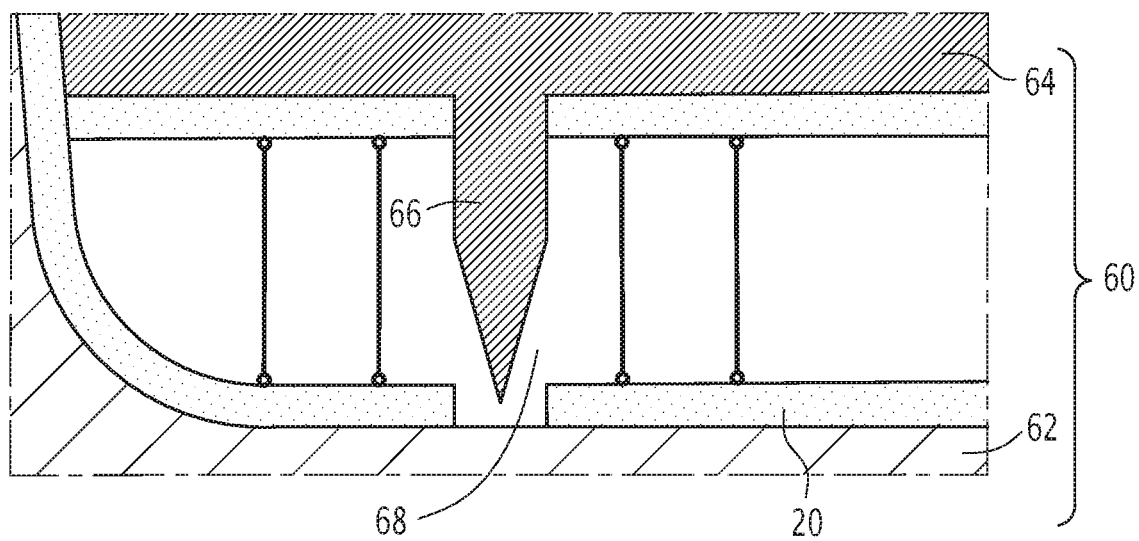
FIG. 8 shows a view similar to FIG. 7, wherein the additional piercing element has pierced the second skin and the spacer in an additional mold.

FIGS. 7 and 8 show another variant of the manufacturing method according to another embodiment of the invention which relates to the thermosetting matrix skin. In this variant, the piercing of the first skin 20 is carried out in a mold 38, while the piercing of the second skin 22 is carried out in an additional mold 60 distinct from the mold 38.

FIG. 7 illustrates the piercing of the first skin 20 in the mold 38. Only the first skin 20 is introduced into the mold 38. The piercing element 52 passes through the first skin 20 as previously described.

FIG. 8 illustrates the piercing of the second skin 22 and the spacer 23 in an additional mold 60. In contrast to the first embodiment, the mold 60 is heated to the crosslinking temperature of the thermosetting matrix. The first skin previously pierced in the mold 38 is introduced at the bottom of the additional mold 60. Then, a spacer 23 and a second skin 22 are introduced between the first additional half-mold 62 and the second additional half-mold 64, wherein the second half additional mold 64 is provided with an additional piercing element 66.

The spacer 23 previously glued to ensure perfect adhesion to the skins 20, 22 is placed on the second skin 20. The glue is preferably a glue that is activated at the crosslinking temperature of the resin.

The additional piercing element 66 is designed to pierce an additional hole 68 through the second skin 22 and the spacer 23. It is arranged to face the through hole 34 of the first skin 20.

The piercing method of the first skin 20 is performed in the mold 38 in a manner similar to that described above and will not be repeated here.

Again, since the piercing member 52 acts before the resin is cured, the reinforcing fibers 28 are free to move. The piercing element 52, therefore, spreads them apart without damaging them. Once the resin is crosslinked, the reinforcing fibers 28 are fixed around the piercing element 52 constituting the periphery of the hole. Moreover, as the reinforcing fibers 28 have been pushed aside, they constitute a denser zone and act as a peripheral stiffener.

After piercing, the first skin 20 with the through hole 34 is assembled on a first face 24 of the spacer 23, wherein the first face 24 is located opposite a second face 25 of the spacer 23. The second skin 22 is fixed on the second face 25 of the spacer 23.

The additional hole 68 extends opposite the through hole 34 in the finished component 10.

In a variant, the piercing element 52 is removable and the orifice 48 is able to be filled in order to use the mold 38 without piercing the composite panel 12.

When using at least some embodiments of the invention described above, the weakening of the composite panels due to the cutting of the fibers during their manufacture is greatly reduced. In particular, the perimeter of the openings is not weakened by piercing. Everything ensures good mechanical strength of a part manufactured according to the invention.

The invention claimed is:

1. A method of manufacturing a component of automotive vehicle equipment, the method comprising:
   arranging at least a first skin capable of solidifying on a first half-mold of a mold;
   closing a second half-mold of the mold to shape the first skin in a molding cavity defined between the first-half mold and the second-half mold;
   solidifying the shaped first skin in the molding cavity, the second half-mold comprising a piercing element having at least one point-shaped end, wherein the method comprises piercing by the piercing element of a through-hole at least in the first skin before the solidification of the first skin; and
   piercing an additional hole through a second skin and a spacer in an additional mold, wherein the shaped first skin is arranged on the spacer so that the additional hole faces the through hole.

2. A method according to claim 1, wherein the first skin comprises a matrix of polymer and fibers embedded in the matrix, wherein the matrix is fluid during the through-hole piercing, and wherein the matrix solidifies around the piercing element after the through-hole piercing.

3. A method according to claim 2, wherein the piercing element displaces the fibers contained in the matrix at a periphery of the piercing element.

4. A method according to claim 3, wherein the following steps are performed after the step of piercing the first skin:

introducing the spacer and second skin between a first additional half-mold and a second additional half-mold of the additional mold, wherein the second additional half-mold is provided with an additional piercing element in the shape of a point, piercing the additional hole through the second skin and the spacer by the additional piercing element; and assembling the first skin on a first face of the spacer located opposite a second face of the spacer on which the second skin is attached, wherein the additional hole extends opposite the through hole.

5. A method according to claim 2, wherein the following steps are performed after the step of piercing the first skin:

introducing the spacer and second skin between a first additional half-mold and a second additional half-mold of the additional mold, wherein the second additional half-mold is provided with an additional piercing element in the shape of a point, piercing the additional hole through the second skin and the spacer by the additional piercing element; and assembling the first skin on a first face of the spacer located opposite a second face of the spacer on which the second skin is attached, wherein the additional hole extends opposite the through hole.

6. A method according to claim 1, wherein the spacer is a honeycomb spacer, wherein the first skin is arranged on a first face of the honeycomb spacer during the piercing in the additional mold, and wherein a piercing element of a second additional half-mold of the additional mold passes through the spacer and into the through hole during the additional hole piercing step.

7. A method according to claim 6, wherein the second skin is arranged on a second face of the spacer, and wherein the piercing element of the second additional half-mold pierces the second skin before piercing the spacer during the additional hole piercing step.

8. A method according to claim 1, wherein the following steps are performed after the step of piercing the first skin:

introducing the spacer and second skin between a first additional half-mold and a second additional half-mold of the additional mold, wherein the second additional half-mold is provided with an additional piercing element in the shape of a point, piercing the additional hole through the second skin and the spacer by the additional piercing element; and assembling the first skin on a first face of the spacer located opposite a second face of the spacer on which the second skin is attached, wherein the additional hole extends opposite the through hole.

9. A method according to claim 1, comprising placing an insert in the through hole.

10. A method according to claim 9, wherein the insert is a socket.

11. A method according to claim 9, wherein the spacer is a honeycomb spacer and wherein the insert is mounted through the through hole and the additional hole.

12. A method according to claim 11, wherein the insert comprises at least one outer retaining protuberance of the insert inserted into the spacer and/or in the first skin.

* * * * *